(12) United States Patent
Machida

(10) Patent No.: US 9,571,467 B2
(45) Date of Patent: Feb. 14, 2017

(54) INFORMATION MANAGEMENT SYSTEM, INFORMATION PROCESSING DEVICE, AND NON-TRANSITORY COMPUTER READABLE MEDIUM

(71) Applicant: FUJI XEROX CO., LTD., Tokyo (JP)

(72) Inventor: Hiroaki Machida, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/577,274

(22) Filed: Dec. 19, 2014

(65) Prior Publication Data

US 2015/0334092 A1 Nov. 19, 2015

(30) Foreign Application Priority Data

May 15, 2014 (JP) ................. 2014-101141

(51) Int. Cl.
*H04L 29/06* (2006.01)
*H04L 9/08* (2006.01)

(52) U.S. Cl.
CPC ......... *H04L 63/0428* (2013.01); *H04L 9/0819* (2013.01); *H04L 2209/24* (2013.01)

(58) Field of Classification Search
CPC ............. G06T 1/00; G06F 3/12; G06F 13/00; G06F 13/372; G06F 21/606; G06F 3/1273; G06F 3/1284; G06F 17/30; G06F 21/62; G06F 2221/2143; G06F 2221/2149; G06F 2221/2153; G06F 21/60; G06F 19/00; G06F 21/602; G06F 19/322; G06F 17/30342; G06K 9/00; G05B 11/01; G05B 13/02; G05B 19/42; G09G 1/02; G06Q 10/06; G06Q 10/00; G06Q 10/10; G06Q 50/24; H04L 63/1425; H04L 9/00; H04L 2209/605; H04N 1/00244; H04N 1/00344; H04N 1/0084; H04N 1/00856; H04N 1/00877; H04N 1/4486; Y10S 707/99938; Y10S 707/99932; Y10S 707/99939

(Continued)

(56) References Cited

U.S. PATENT DOCUMENTS 7,574,440 B2 * 8/2009 Kichikawa ............... G06F 21/62
8,073,257 B2 * 12/2011 Uchikawa .......... H04N 1/00326
348/474

(Continued)

FOREIGN PATENT DOCUMENTS

JP A-2000-207318 7/2000

*Primary Examiner* — Thanhnga B Truong
(74) *Attorney, Agent, or Firm* — Oliff PLC

(57) ABSTRACT

An information management system includes an information processing device, and an information management device that prepares log information indicating a content of communication with the information processing device. The information processing device includes a recording data acquisition unit, an encryption unit, and a transmitting unit. The recording data acquisition unit sequentially acquires recording data indicating a content of communication between the information management device and the information processing device. The encryption unit encrypts the recording data to prepare encrypted data. The transmitting unit transmits the encrypted data to the information management device. The information management device includes a log information preparation unit that prepares the log information including the encrypted data.

8 Claims, 14 Drawing Sheets

(58) Field of Classification Search
USPC . 713/168, 193; 382/181, 173, 304; 348/474,
348/501; 345/27, 501; 700/14, 18, 29,
700/86, 19; 709/223–224; 707/999.002,
707/999.008, 999.009
See application file for complete search history.

(56) References Cited

U.S. PATENT DOCUMENTS

| | | | |
|---|---|---|---|
| 9,047,031 B2* | 6/2015 | Tanaka | G06F 21/606 |
| 2004/0073665 A1* | 4/2004 | Fujiwara | G06Q 10/10 |
| | | | 709/224 |
| 2007/0032887 A1* | 2/2007 | Muroi | G06Q 10/06 |
| | | | 700/19 |

* cited by examiner

FIG. 3

```
01: <?xml version="x.x" encoding="UTF-8"?>
02: ...
03: <ep:Data>
04: <ep:DateTime>yyyy-mm-dd-hh:mm:ss</ep:DateTime>
05: <ep:DataType>NOTIFICATION OF CONFIDENTIAL INFORMATION A</ep:DataType>
06: ...
07: <sc:Object name="CUSTOMER INFORMATION"identifier="1">
08: <sc:Attribute name="Type">CUSTOMER INFORMATION 1</sc:Attribute>
09: <sc:Attribute name="Count">AAA CORPORATION</sc:Attribute>
10: </sc:Object>
11: <sc:Object name="CUSTOMER INFORMATION"identifier="2">
12: <sc:Attribute name="Type">CUSTOMER INFORMATION 2</sc:Attribute>
13: <sc:Attribute name="Count">BBB CORPORATION</sc:Attribute>
14: </sc:Object>
15: <sc:Object name="CUSTOMER INFORMATION"identifier="3">
16: <sc:Attribute name="Type">CUSTOMER INFORMATION</sc:Attribute>
17: <sc:Attribute name="Count">CCC CORPORATION</sc:Attribute>
18: </sc:Object>
19: ...
20: </ep:Data>
```

| TYPE OF CONTENT OF COMMUNICATION | CONTENT OF DATA PROCESSING |
|---|---|
| NOTIFICATION OF REMAINING AMOUNT OF CONSUMABLE ARTICLES | NO ENCRYPTION |
| NOTIFICATION OF CONFIDENTIAL INFORMATION A | FIRST ENCRYPTION PROCESS |
| NOTIFICATION OF CONFIDENTIAL INFORMATION B | SECOND ENCRYPTION PROCESS |
| | |

FIG. 6

```
01: ----
02: Content-Id: Dev-0001
03: Content-Transfer-Encoding: 8bit
04: Content-Type: text/xml; charset="UTF-8"
05:
06: <?xml version="x.x" encoding="UTF-8"?>
07: ...
08: <ep:Data>
09: <ep:DateTime>yyyy-mm-dd-hh:mm:ss</ep:DateTime>
10: <ep:DataType>NOTIFICATION OF CONFIDENTIAL INFORMATION A</ep:DataType>
11: ...
12: <sc:Object name="CUSTOMER INFORMATION"identifier="1">
13: <sc:Attribute name="Type">CUSTOMER INFORMATION 1</sc:Attribute>
14: <sc:Attribute name="Count">AAA CORPORATION</sc:Attribute>
15: </sc:Object>
16: <sc:Object name="CUSTOMER INFORMATION"identifier="2">
17: <sc:Attribute name="Type">CUSTOMER INFORMATION 2</sc:Attribute>
18: <sc:Attribute name="Count">BBB CORPORATION</sc:Attribute>
19: </sc:Object>
20: <sc:Object name="CUSTOMER INFORMATION"identifier="3">
21: <sc:Attribute name="Type">CUSTOMER INFORMATION</sc:Attribute>
22: <sc:Attribute name="Count">CCC CORPORATION</sc:Attribute>
23: </sc:Object>
24: ...
25: </ep:Data>
26:
27: ----
28: Content-Id: abcdefg
29: Content-Transfer-Encoding: binary
30: Content-Type: application/octet-stream
31:
32: XXXXXXXXXXXXXXX
33: XXXXXXXXXXX
34: ...
35: ----
```

FIG. 7

| DEVICE ID | TYPE OF CONTENT OF COMMUNICATION | CONTENT OF DATA PROCESSING |
|---|---|---|
| Dev-0001 | NOTIFICATION OF REMAINING AMOUNT OF CONSUMABLE ARTICLES | NO ENCRYPTION |
| Dev-0001 | NOTIFICATION OF CONFIDENTIAL INFORMATION A | FIRST ENCRYPTION PROCESS |
| Dev-0001 | NOTIFICATION OF CONFIDENTIAL INFORMATION B | SECOND ENCRYPTION PROCESS |
| Dev-0002 | NOTIFICATION OF BILLING METER VALUE | NO ENCRYPTION |
| Dev-0002 | NOTIFICATION OF CUSTOMER INFORMATION | FIRST ENCRYPTION PROCESS |
| Dev-0002 | NOTIFICATION OF USER INFORMATION | SECOND ENCRYPTION PROCESS |
|  |  |  |

FIG. 8

| DEVICE ID | SECURITY KEY |
|---|---|
| Dev-0001 | AAAAAA |
| Dev-0002 | BBBBBB |
|  |  |

FIG. 9

```
01: <?xml version="x.x" encoding="UTF-8"?>
02: ...
03: <ep:Data>
04: <ep:DateTime>yyyy-mm-dd-hh:mm:ss</ep:DateTime>
05: <ep:DataType>NOTIFICATION OF CONFIDENTIAL INFORMATION A</ep:DataType>
06: ...
07: <sc:Object name="CUSTOMER INFORMATION"identifier="1">
08: <sc:Attribute name="Type">CUSTOMER INFORMATION 1</sc:Attribute>
09: <sc:Attribute name="Count">XXXXX</sc:Attribute>
10: </sc:Object>
11: <sc:Object name="CUSTOMER INFORMATION"identifier="2">
12: <sc:Attribute name="Type">CUSTOMER INFORMATION 2</sc:Attribute>
13: <sc:Attribute name="Count">XXXXX</sc:Attribute>
14: </sc:Object>
15: <sc:Object name="CUSTOMER INFORMATION"identifier="3">
16: <sc:Attribute name="Type">CUSTOMER INFORMATION</sc:Attribute>
17: <sc:Attribute name="Count">XXXXX</sc:Attribute>
18: </sc:Object>
19: ...
20: </ep:Data>
```

FIG. 10

| DATE AND TIME OF UPDATE | DEVICE ID | SENDER | TYPE OF CONTENT OF COMMUNICATION | CONTENT OF DATA PROCESSING | LOCATION OF STORAGE OF RECORDING DATA | SUPPLEMENTARY INFORMATION |
|---|---|---|---|---|---|---|
| yyyy/mm/dd hh:mm:ss | Dev-0001 | INFORMATION PROCESSING DEVICE | NOTIFICATION OF REMAINING AMOUNT OF CONSUMABLE ARTICLES | NO ENCRYPTION | file:///Dev0001/remaining amount of consumable articles_yymmdd.log | |
| yyyy/mm/dd hh:mm:ss | Dev-0001 | INFORMATION PROCESSING DEVICE | NOTIFICATION OF CONFIDENTIAL INFORMATION B | SECOND ENCRYPTION PROCESS | file:///Dev0001/confidential information B(mod)_yymmdd.log<br>file:///Dev0001/confidential information B_yymmdd.log.enc | |
| yyyy/mm/dd hh:mm:ss | Dev-0001 | INFORMATION MANAGEMENT DEVICE | NOTIFICATION OF CONFIDENTIAL INFORMATION B | SECOND ENCRYPTION PROCESS | file:///Dev0001/confidential information B(mod)_res_yymmdd.log<br>file:///Dev0001/confidential information B_res_yymmdd.log.enc | |
| yyyy/mm/dd hh:mm:ss | Dev-0001 | INFORMATION PROCESSING DEVICE | NOTIFICATION OF CONFIDENTIAL INFORMATION A | FIRST ENCRYPTION PROCESS | file:///Dev0001/confidential information A(mod)_yymmdd.log<br>file:///Dev0001/confidential information A_yymmdd.log.enc | |
| yyyy/mm/dd hh:mm:ss | Dev-0001 | INFORMATION MANAGEMENT DEVICE | NOTIFICATION OF CONFIDENTIAL INFORMATION A | FIRST ENCRYPTION PROCESS | file:///Dev0001/confidential information A(mod)_res_yymmdd.log<br>file:///Dev0001/confidential information A_res_yymmdd.log.enc | TEMPORARY STORAGE |
| yyyy/mm/dd hh:mm:ss | Dev-0002 | INFORMATION MANAGEMENT DEVICE | NOTIFICATION OF BILLING METER VALUE | NO ENCRYPTION | file:///Dev0002/billing meter_yymmdd.log | |
| yyyy/mm/dd hh:mm:ss | Dev-0002 | INFORMATION PROCESSING DEVICE | NOTIFICATION OF BILLING METER VALUE | NO ENCRYPTION | file:///Dev0002/billing meter_res_yymmdd.log | |

INFORMATION MANAGEMENT SYSTEM, INFORMATION PROCESSING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-101141 filed May 15, 2014.

BACKGROUND (i) Technical Field

The present invention relates to an information management system, an information processing device, and a non-transitory computer readable medium.

(ii) Related Art

There is known an information management device that prepares and manages log information indicating the content of communication performed with an information processing device for the purpose of failure analysis.

SUMMARY

According to an aspect of the present invention, there is provided an information management system including: an information processing device; and an information management device that prepares log information indicating a content of communication with the information processing device, in which the information processing device includes a recording data acquisition unit that sequentially acquires recording data indicating a content of communication between the information management device and the information processing device, an encryption unit that encrypts the recording data to prepare encrypted data, and a transmitting unit that transmits the encrypted data to the information management device, and the information management device includes a log information preparation unit that prepares the log information including the encrypted data.

BRIEF DESCRIPTION OF THE DRAWINGS

An exemplary embodiment of the present invention will be described in detail based on the following figures, wherein:

FIG. 3 illustrates an example of recording data;

FIG. 6 illustrates an example of first transmission data;

FIG. 7 illustrates an example of data stored in a second setting information storage section;

FIG. 8 illustrates an example of data stored in a second security key storage section;

FIG. 9 illustrates an example of modified data;

FIG. 10 illustrates an example of log information prepared by a log information preparation section;

DETAILED DESCRIPTION

Figure 1:
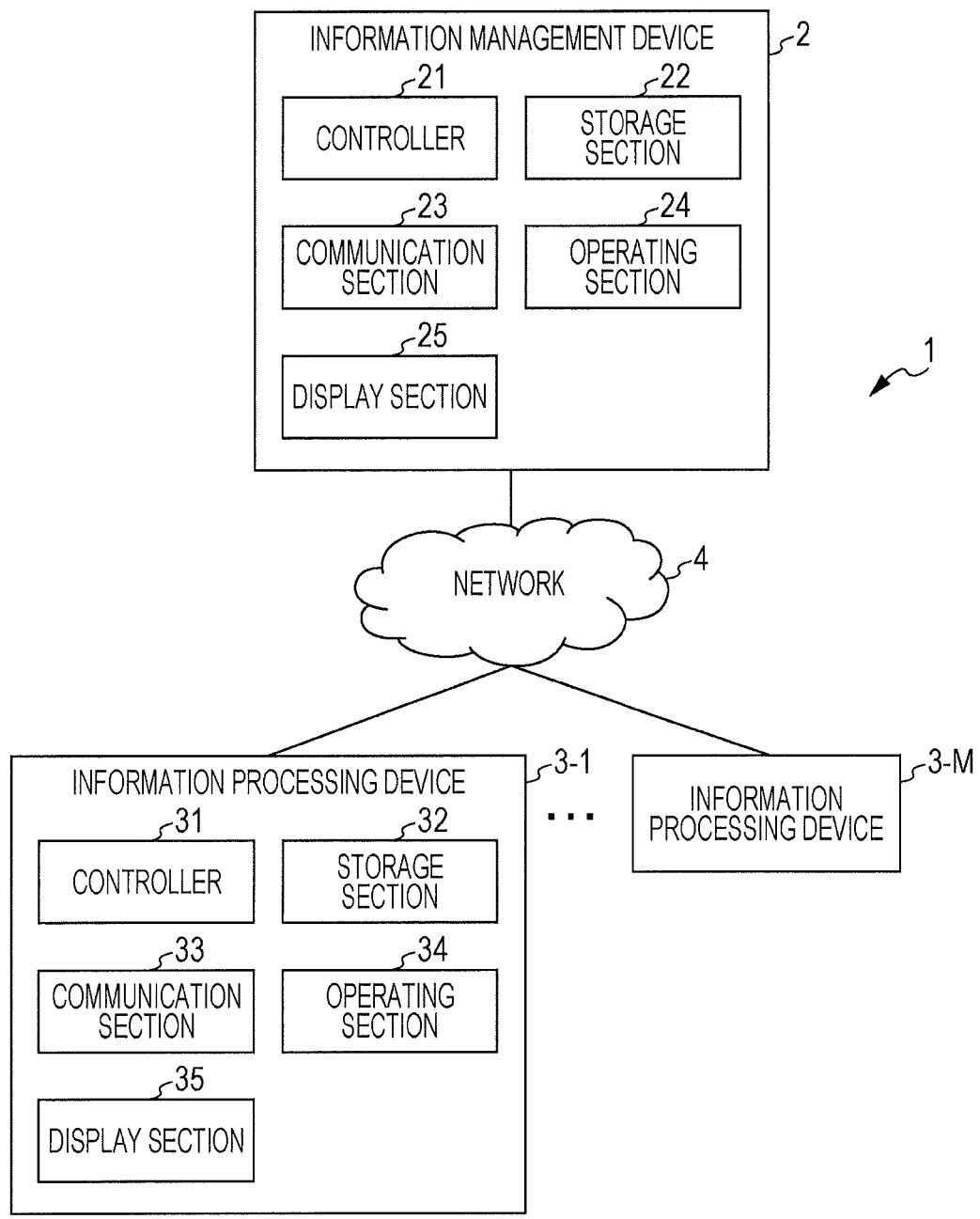
FIG. 1 illustrates an example of the device configuration of an information management system.

An exemplary embodiment of the present invention will be described below with reference to the drawings. In the drawings attached hereto, components that are similar to those discussed already in relation to a previous drawing may be given the same reference numerals to omit detailed description thereof as appropriate.

[1. System Configuration]

FIG. 1 illustrates an example of the device configuration of an information management system 1 according to the exemplary embodiment. As illustrated in FIG. 1, the information management system 1 includes an information management device 2 used mainly by a service provider, and information processing devices 3-1 to 3-M (M is an integer of one or more) (hereinafter occasionally referred to simply as an "information processing device 3") used by one or more users to which a service is provided. The information management device 2 may be a server computer installed in a data center, for example. The information processing device 3 may be a personal computer, a multi-function device, a cellular phone, a tablet terminal, a personal digital assistant (PDA), or a server computer, for example. The information management device 2 and the information processing device 3 are connected to each other via a network 4 that enables data communication such as a computer communication network. The devices may exchange data with each other even if installed at remote locations.

[2. Hardware Configuration]

Next, an example of the hardware configuration of the information management device 2 and the information processing device 3 will be described with reference to FIG. 1.

First, the hardware configuration of the information management device 2 will be described. As illustrated in FIG. 1, the information management device 2 includes a controller 21, a storage section 22, a communication section 23, an operating section 24, and a display section 25.

The controller 21 includes a microprocessor or the like, for example. The controller 21 operates in accordance with an operating system and a program stored in the storage section 22, executes a variety of computation processes, and controls the various sections of the information management device 2.

The storage section 22 is composed of a memory device such as a RAM or a flash memory, a hard disk drive, or the like, for example. The storage section 22 stores programs, data, input information, computation results, and so forth.

The communication section 23 performs data communication through a wire or wirelessly, and is composed of a communication integrated circuit, a connector, and so forth for a wired LAN in the case where wired data communication is to be performed, and composed of an integrated circuit, an antenna, and so forth for a wireless LAN in the case where wireless data communication is to be performed, for example. The communication section 23 exchanges data with other device via the network 4 which enables data communication such as a computer communication network.

The operating section 24 is composed of an input device such as a mouse, a keyboard, a button, and a touch panel, for example, and receives an operation performed by the user and outputs the content of the received operation to the controller 21.

The display section 25 is a liquid crystal display or the like, for example, and displays a screen that indicates the result of information processing performed by the controller 21.

The information processing device 3 includes a controller 31, a storage section 32, a communication section 33, an operating section 34, and a display section 35. Such sections are similar to the hardware components of the information management device 2, and therefore are not described.

[3. Functional Blocks]

Figure 2:
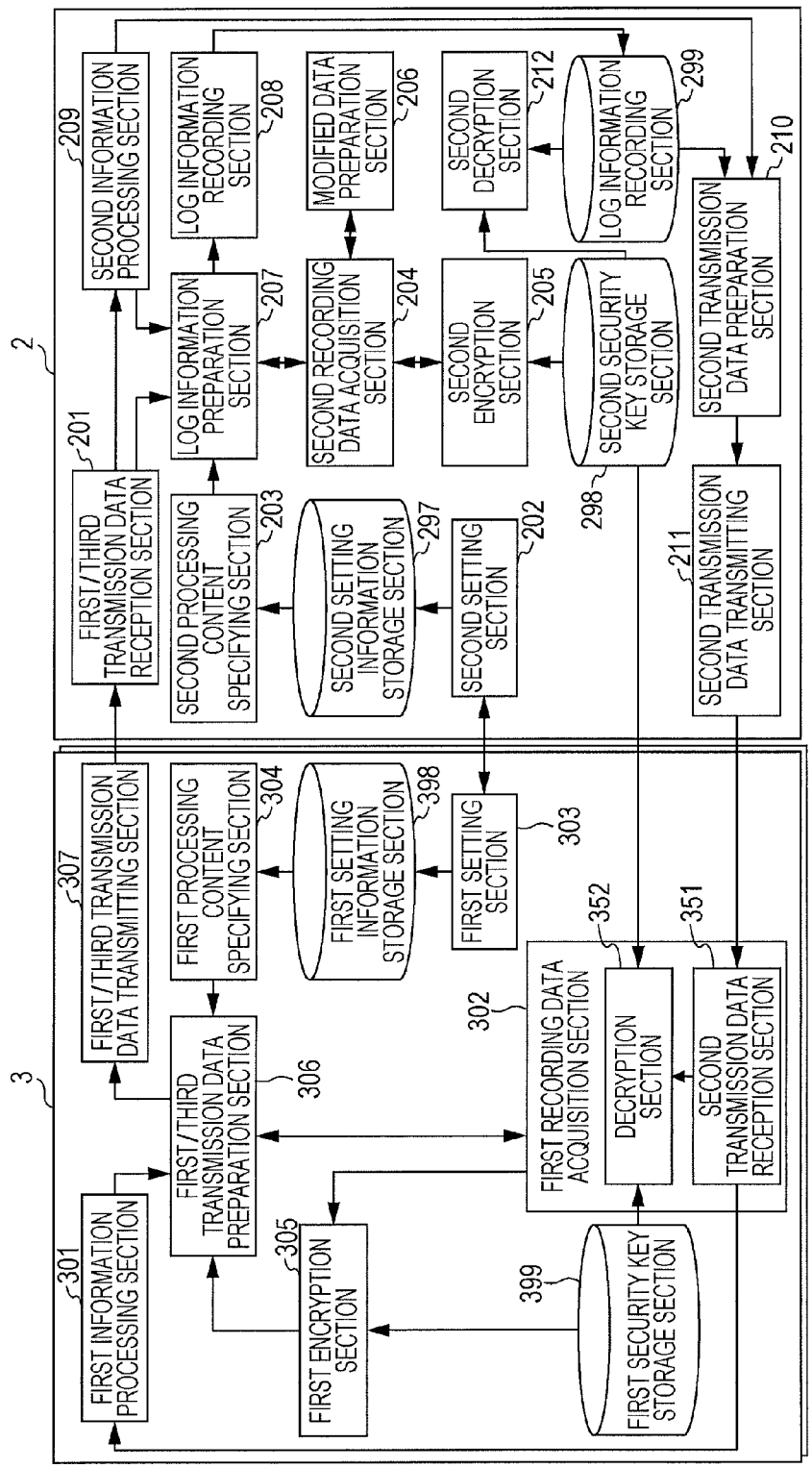
FIG. 2 is a functional block diagram illustrating an example of the functional configuration of the information management system.

Next, an example of the functions of the information processing device 3 and the information management device 2 will be described with reference to the functional block diagram illustrated in FIG. 2 which illustrates an example of the functional configuration of the information management system 1.

[3-1. Functional Blocks of Information Processing Device]

First, an example of the functions of the information processing device 3 will be described. As illustrated in FIG. 2, the information processing device 3 functionally includes a first information processing section 301, a first recording data acquisition section 302, a first setting section 303, a first processing content specifying section 304, a first encryption section 305, a first/third transmission data preparation section 306, a first/third transmission data transmitting section 307, a first setting information storage section 398, and a first security key storage section 399. Such functions are implemented by the control section 31 executing the programs stored in the storage section 32. The programs are supplied to the information processing device 3 via a computer-readable information storage medium such as an optical disc, a magnetic disk, or a flash memory or via a communication unit such as a computer communication network or a cellular phone network, for example. The functions of the various sections of the information processing device 3 will be described in detail below.

The first information processing section 301 executes predetermined information processing, and provides an instruction for transmission to the information management device 2. The first information processing section 301 executes information processing according to a request input by the user via the operating section 34 of the information processing device 3 or a request transmitted from the information management device 2, for example, and provides an instruction for transmission that designates the result of execution of the information processing as the content to be transmitted to the information management device 2.

In the exemplary embodiment, the content to be transmitted to the information management device 2 may be information that may be made open to the service provider who uses the information management device 2 without causing inconvenience, and may be information that should not be known by others. Examples of the content to be transmitted to the information management device 2 include a billing meter value increased along with the use of a charged service, the operational status of an application program, the remaining amount of consumable articles, personal information of the user, customer information, and other confidential information.

The first recording data acquisition section 302 sequentially acquires recording data indicating the content of communication between the information management device 2 and the information processing device 3. More specifically, the first recording data acquisition section 302 acquires, as the recording data included in log information, recording data indicating the content to be transmitted to the information management device 2 and recording data indicating the content transmitted from the information management device 2.

In the exemplary embodiment, the first recording data acquisition section 302 acquires, as the recording data indicating the content to be transmitted to the information management device 2, the content for transmission itself designated in the instruction for transmission provided by the first information processing section 301. However, the present invention is not limited thereto, and the first recording data acquisition section 302 may acquire a part of the content for transmission, and may acquire the result of computation performed on the basis of the content of communication.

In the exemplary embodiment, the first recording data acquisition section 302 acquires, as the recording data indicating the content transmitted from the information management device 2, recording data included in transmission data (hereinafter referred to also as "second transmission data") transmitted from the information management device 2.

FIG. 3 illustrates an example of the recording data. The first recording data acquisition section 302 acquires recording data including the content of communication such as customer information indicated in FIG. 3, for example. In FIG. 3, line 5 indicates the type of the content of communication.

The first recording data acquisition section 302 functionally includes a second transmission data reception section 351 and a decryption section 352. The functions of the sections included in the first recording data acquisition section 302 will be described below.

The second transmission data reception section 351 receives second transmission data including at least one piece of recording data from the information management device 2. In this case, the first recording data acquisition section 302 acquires recording data indicating the content transmitted from the information management device 2 and included in the received second transmission data.

In addition, the second transmission data reception section 351 receives encrypted recording data from the information management device 2. More specifically, the second transmission data reception section 351 receives second transmission data including either of recording data encrypted in the information management device 2 and recording data encrypted in the information processing device 3.

The decryption section 352 decrypts the encrypted recording data. In the exemplary embodiment, the decryption section 352 decrypts the recording data encrypted in the information management device 2 and the recording data encrypted in the information processing device 3. In this case, the first recording data acquisition section 302 acquires the recording data before being encrypted which have been decrypted by the decryption section 352.

The first setting information storage section 398 stores the content of data processing set for each type of the content of communication. The content of data processing refers to the content of a process to be performed on the recording data included in the log information. In the exemplary embodiment, the first setting information storage section 398 stores information set by the user in the first setting section 303 to be discussed later.

Figures 4, 5:
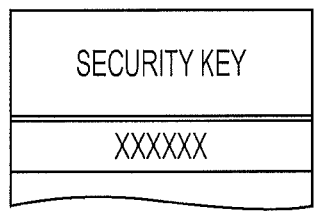
FIG. 4 illustrates an example of data stored in a first setting information storage section.
FIG. 5 illustrates an example of data stored in a first security key storage section.

FIG. 4 illustrates an example of the data stored in the first setting information storage section 398. As illustrated in FIG. 4, the first setting information storage section 398 stores the type of the content of communication and the content of data processing as associated with each other.

The first setting section 303 sets the content of data processing matching the type of the content of communication. The first setting section 303 displays, on the display section 35 of the information processing device 3, a graphical user interface (hereinafter referred to as a "communication setting GUI") used to set the content of data processing matching the type of the content of communication, for example. The communication setting GUI receives an input operation performed by the user to allow setting the content of data processing for each type of the content of communication. The communication setting GUI enables setting, at the user's discretion, whether the content of communication, such as "notification of billing meter value", "notification of remaining amount of consumable articles", and "notification of customer information", is information that may be made open to the service provider who uses the information management device 2 without causing inconvenience or information that should not be known by others, for example.

More specifically, the communication setting GUI not only allows adding and deleting information indicating the type of the content of communication, but also allows setting, as the content of data processing to be executed in accordance with the type of the content of communication, one of "no encryption", "first encryption process" corresponding to a first condition to be described below, and "second encryption process" corresponding to a second condition. Therefore, the type of the content of communication that meets the first condition and the type of the content of communication that meets the second condition are different from each other. The content of data processing that may be set in the communication setting GUI according to the exemplary embodiment will be described below.

First, in the case where the content of data processing is set to "no encryption", the recording data are not subjected to any data processing such as an encryption process, and the log information includes recording data indicating the content of communication itself.

For example, if recording data including the content of communication itself are left in the log information in a failure analysis performed by the service provider, it is considered that useful information is highly likely obtained compared to a case where only modified data to be described below are referenced. Therefore, it is desirable for the service provider that the content of data processing should be set to "no encryption" for the type of the content of communication to the extent possible without causing inconvenience to the user.

In the case where the content of data processing is set to "second encryption", modified data prepared by modifying or erasing a predetermined target portion (e.g. a portion that should be kept secret such as customer information) of the recording data and recording data encrypted in the information management device 2 are prepared, and such data are included in the log information. The recording data encrypted in the information management device 2 may be decrypted in the information management device 2.

For the user of the information processing device 3, on the other hand, the recording data are stored with the target portion, which should be kept secret, modified or deleted or stored as encrypted.

In the case where the content of data processing is set to "first encryption", modified data and recording data encrypted in the information processing device 3 are prepared, and such data are included in the log information.

The recording data encrypted in the information processing device 3 may be decrypted only by the information processing device 3.

The first processing content specifying section 304 specifies the content of data processing set for the type of the content of communication. The first processing content specifying section 304 specifies the content of data processing set for the type of the content of communication related to the recording data acquired by the first recording data acquisition section 302. In the case where the type of the content of communication indicated by the recording data or the like is "notification of confidential information A", for example, the first processing content specifying section 304 specifies the content of data processing "first encryption process", which is set for the type of the content of communication described above, among those stored in the first setting information storage section 398 (see FIG. 4).

The first security key storage section 399 stores a first encryption key to be used when the first encryption section 305 to be discussed later encrypts data, and a first decryption key used for decryption performed by the decryption section 352.

FIG. 5 illustrates an example of the data stored in the first security key storage section 399. In the exemplary embodiment, the first security key storage section 399 stores key information (hereinafter referred to also as a "first security key") based on a common-key encryption scheme. However, the present invention is not limited thereto, and the first security key storage section 399 may store key information as a combination of a public key (encryption key) based on a public-key encryption scheme and a secret key (decryption key). In the exemplary embodiment, the first security key managed in the information processing device 3 is managed in secrecy. That is, the first security key is not made public to the service provider who uses the information management device 2, and may not be acquired or referenced from the information management device 2.

The first encryption section 305 prepares first encrypted data by encrypting the recording data indicating the content of communication between the information management device 2 and the information processing device 3 and of the type that meets the predetermined first condition. More specifically, in the case where the type of the content of communication for the recording data acquired by the first recording data acquisition section 302 meets the predetermined first condition (that is, the content of data processing set for the type of the content of communication is "first encryption process"), the first encryption section 305 encrypts the recording data to prepare the first encrypted data.

In addition, the first encryption section 305 prepares the first encrypted data using the first encryption key. More specifically, the first encryption section 305 prepares the first encrypted data by encrypting the recording data using the first security key stored in the first security key storage section 399. In the exemplary embodiment, the first security key is managed in secrecy in the information processing device 3. Therefore, the first encrypted data may not be decrypted in the information management device 2 or other devices.

In addition, for the reason stated above, the recording data may not be directly encrypted using the first security key in the information management device 2. Instead, the first encryption section 305 of the information processing device 3 prepares third encrypted data by encrypting the recording data prepared in the information management device 2 using the first security key. More specifically, in the case where the second transmission data reception section 351 receives second transmission data including recording data, the first encryption section 305 encrypts the recording data to prepare the third encrypted data.

The first/third transmission data preparation section 306 prepares first transmission data and third transmission data to be transmitted to the information management device 2. The first transmission data are data indicating the content for transmission designated in the instruction for transmission provided by the first information processing section 301. In the exemplary embodiment, the first transmission data include the recording data acquired by the first recording data acquisition section 302. In the case where first encrypted data related to the recording data are prepared, the first transmission data are data including the prepared first encrypted data. Meanwhile, the third transmission data are data including the third encrypted data related to the recording data received from the information management device 2.

FIG. 6 illustrates an example of the first transmission data. In the illustrated first transmission data, lines 6 to 25 indicate the content of the recording data, and line 10 particularly describes the type of the content for transmission. In the case where the type of the content for transmission meets a predetermined condition (in the exemplary embodiment, in the case where the content of data processing set for the type of the content of communication is "first encryption process"), lines 28 to 34, for example, have been added to the first transmission data as the first encrypted data. In the case where the type of the content for transmission does not meet a predetermined condition (in the exemplary embodiment, in the case where the content of data processing set for the type of the content of communication is different from "first encryption process"), the recording data are not encrypted, and lines 28 to 34 are not added to the first transmission data.

The first/third transmission data transmitting section 307 transmits the encrypted data to the information management device 2. In addition, the first/third transmission data transmitting section 307 transmits at least one piece of the recording data to the information management device 2 without encrypting such data.

More specifically, the first/third transmission data transmitting section 307 transmits the first transmission data or the third transmission data prepared by the first/third transmission data preparation section 306. For example, in the case where the content of data processing set for the content for transmission is "first encryption process", the first/third transmission data transmitting section 307 transmits the first transmission data including the first encrypted data. In the case where the set content of data processing is different from "first encryption process", meanwhile, the recording data acquired by the first recording data acquisition section 302 are not encrypted, and the first/third transmission data transmitting section 307 transmits the first transmission data not including the first encrypted data.

In the case where the second transmission data reception section 351 of the information processing device 3 receives the second transmission data including the recording data (or the recording data encrypted in the information management device 2), the first/third transmission data transmitting section 307 transmits the third transmission data including the third encrypted data prepared by encrypting the recording data included in the received second transmission data (or the recording data decrypted from the second encrypted data).

[3-2. Functional Blocks of Information Management Device]

Next, an example of the functions of the information management device 2 will be described. As illustrated in FIG. 2, the information management device 2 functionally includes a first/third transmission data reception section 201, a second setting section 202, a second processing content specifying section 203, a second recording data acquisition section 204, a second encryption section 205, a modified data preparation section 206, a log information preparation section 207, a log information recording section 208, a second information processing section 209, a second transmission data preparation section 210, a second transmission data transmitting section 211, a second decryption section 212, a second setting information storage section 297, a second security key storage section 298, and a log information recording section 299. Such functions are implemented by the control section 21 executing the programs stored in the storage section 22. The programs are supplied to the information management device 2 via a computer-readable information storage medium such as an optical disc, a magnetic disk, or a flash memory or via a communication unit such as a computer communication network, for example. The functions of the various sections of the information management system 2 will be described in detail below.

The first/third transmission data reception section 201 receives the first transmission data and the third transmission data transmitted from the information processing device 3. More specifically, the first/third transmission data reception section 201 receives the first transmission data including the recording data, the first transmission data including the first encrypted data in addition to the recording data, and the third transmission data including the third encrypted data.

The second setting information storage section 297 stores the content of data processing set for each type of the content of communication for at least one of the information processing devices 3.

FIG. 7 illustrates an example of the data stored in the second setting information storage section 297. As illustrated in FIG. 7, the second setting information storage section 297 stores the device ID for identification of the information processing device 3, the type of the content of communication, and the content of data processing as associated with each other.

The second setting section 202 sets the content of data processing matching the device ID and the type of the content of communication. Specifically, the second setting section 202 displays, on the display section 25 of the information management device 2, a communication setting GUI that is similar to that displayed by the first setting section 303, receives an operation input from the user, and sets the content of data processing matching the type of the content of communication, for example. The communication setting GUI enables setting the device ID, besides the type of the content of communication and the content of data processing.

In addition, the second setting section 202 may communicate with the first setting section 303 of the information processing device 3 to cause the setting content stored in the first setting information storage section 398 of the information processing device 3 to be reflected in the setting content in the second setting information storage section 297, or cause the setting content in the second setting information storage section 297 to be reflected in the setting content in the first setting information storage section 398. That is, the setting content in the second setting information storage section 297 and the setting content in the first setting information storage section 398 may be synchronized with each other.

The second processing content specifying section 203 specifies the content of data processing set for the type of the content of communication. In the exemplary embodiment, the second processing content specifying section 203 specifies the content of data processing set for the type of the content for transmission associated with the device ID which identifies the information processing device 3 for each of the content transmitted from the information processing device 3 and the content to be transmitted to the information processing device 3. In the case where transmission data indicating that the type of the content of communication is "notification of confidential information B" are transmitted from the information processing device 3 identified by the device ID "Dev-0001", for example, the second processing content specifying section 203 specifies the content of data processing "second encryption process", which is set for the type of the content of communication described above, among those stored in the second setting information storage section 297 (see FIG. 7), in the information processing device 3.

The second recording data acquisition section 204 sequentially acquires recording data indicating the content of communication between the information management device 2 and the information processing device 3. More specifically, the second recording data acquisition section 204 acquires, as the recording data indicating the content transmitted from the information processing device 3, the recording data included in the transmitted first transmission data, the first encrypted data included in the first transmission data, and the third encrypted data included in the third transmission data.

In addition, the second recording data acquisition section 204 acquires, as the recording data indicating the content to be transmitted to the information processing device 3, the recording data including at least a part of the content for transmission designated in the instruction for transmission provided by the second information processing section 209 to be discussed later, for example.

In the exemplary embodiment, the content for transmission from the information management device 2 to the information processing device 3 may be information that may be made open to the service provider without causing inconvenience, and information that should not be known by others, as with the content transmitted from the information processing device 3. Examples of the content to be transmitted to the information processing device 3 may include a response to the content transmitted from the information processing device 3, a content that requests transmission of a billing meter value, customer information, or the like, or setting information set in the information processing device 3 (such as an e-mail address set for e-mail software, for example).

The second security key storage section 298 stores a second encryption key to be used when the second encryption section 205 to be discussed later encrypts data, and a second decryption key used for decryption performed by the decryption section 352.

FIG. 8 illustrates an example of the data stored in the second security key storage section 298. As illustrated in FIG. 8, the second security key storage section 298 stores key information (hereinafter referred to also as a "second security key") for each device ID that indicates the information processing device 3, for example. The second security key is different from the first security key managed in the information processing device 3. In the exemplary embodiment, in addition, the second security key is made public to the user who uses the information processing device 3 related to the second security key and the service provider, and stored in such a state that allows the second security key to be acquired or referenced from the information management device 2 and the information processing device 3.

The second encryption section 205 prepares second encrypted data by encrypting the recording data indicating the content of communication between the information management device 2 and the information processing device 3 and of the type that meets the predetermined second condition. More specifically, in the case where the type of the content of communication related to the recording data acquired by the second recording data acquisition section 204 meets the predetermined second condition (that is, the content of data processing set for the type of the content of communication is "second encryption process"), the second encryption section 205 encrypts the recording data to prepare the second encrypted data.

In addition, the second encryption section 205 prepares the second encrypted data using the second encryption key which is different from the first encryption key. More specifically, the second encryption section 205 prepares the second encrypted data by encrypting the recording data using the second security key stored in the second security key storage section 298. In the exemplary embodiment, the second encrypted data may be decrypted by the second decryption section 212 to be discussed later, and the service provider who uses the information management device 2 may view the content of the recording data decrypted from the second encrypted data as necessary.

In addition, the information management device 2 may not reference the first security key as discussed earlier. Therefore, the second encryption section 205 may not encrypt the recording data using the first security key. Thus, the second encryption section 205 prepares the second encrypted data by encrypting the recording data for which the content of data processing set for the type of the content of communication is "first encryption process", among the recording data indicating the content to be transmitted to the information processing device 3, using the second security key in place of the first security key.

The modified data preparation section 206 prepares modified data by modifying or erasing a predetermined target portion of the recording data. More specifically, the modified data preparation section 206 prepares the modified data by modifying or erasing a target portion that should be kept secret such as personal information, for example, among the recording data acquired by the second recording data acquisition section 204. In the exemplary embodiment, the modified data preparation section 206 prepares the modified data in the case where the content of data processing specified by the second processing content specifying section 203 is "first encryption process" or "second encryption process".

FIG. 9 illustrates an example of the modified data. The modified data preparation section 206 prepares the modified data by modifying or erasing a target portion that should be kept secret such as customer information, for example, as in lines 9, 13, and 17 of the illustrated modified data, for example. The modified data and the recording data from which the modified data have been prepared have the same content except for the target portion and the same data format. Therefore, the service provider may check the content of the recording data other than the target portion and check if there is any abnormality in data format or any loss of data by checking the modified data.

The log information preparation section 207 prepares the log information indicating the content of communication between the information management device 2 and the information processing device 3. More specifically, the log information preparation section 207 prepares log information including the recording data received from the information processing device 3 and log information including the recording data indicating the content to be transmitted to the information processing device 3.

FIG. 10 illustrates an example of the log information prepared by the log information preparation section 207. As illustrated in FIG. 7, the log information preparation section 207 prepares the log information including at least one piece of the recording data indicating the content of communication between the information management device 2 and the information processing device 3. The prepared log information includes the date and time when the recording data are updated, the device ID which identifies the information processing device 3 involved in the communication, information indicating whether the sender is the information processing device 3 or the information management device 2, the type of the content of communication, the content of data processing specified by the second processing content specifying section 203, the location where the recording data are stored, and supplementary information, for example.

The log information preparation section 207 prepares the following three types of log information, for example, as the log information including the recording data received from the information processing device 3.

Firstly, the log information preparation section 207 prepares log information including at least one piece of unencrypted recording data. More specifically, in the case where the type of the content of communication indicated by the first transmission data transmitted from the information processing device 3 meets a condition that is different from the first condition and the second condition (that is, in the case where the type of the content of communication is set to "no encryption"), the log information preparation section 207 prepares log information including unencrypted recording data included in the transmitted first transmission data.

In this case, the log information preparation section 207 prepares log information including the recording data indicated in line 1 (or line 7), in particular, among the log information illustrated in FIG. 10. The sender is "information processing device", and the recording data "remaining amount of consumable articles_yymmdd.log" indicates the content of communication itself. The recording data are expected to include information that is useful in a failure analysis performed by the service provider with a high probability, but on the other hand, provide a concern about the security for the user.

Secondly, the log information preparation section 207 prepares log information including a predetermined target portion, which has been encrypted, of the recording data together with the modified data prepared by modifying or erasing the target portion. More specifically, the log information preparation section 207 prepares log information including the second encrypted data related to the recording data indicating the content of communication of the type that meets the predetermined second condition together with the modified data prepared by modifying or erasing the predetermined target portion of the recording data. In the exemplary embodiment, in the case where the type of the content of communication indicated by the first transmission data transmitted from the information processing device 3 meets the second condition (that is, in the case where the type of the content of communication is set to "second encryption"), the log information preparation section 207 prepares log information including the second encrypted data prepared by encrypting the recording data in the first transmission data together with the modified data prepared from the recording data.

In this case, the log information preparation section 207 prepares log information including the recording data indicated in line 2, in particular, among the log information illustrated in FIG. 10. The recording data "confidential information B(mod)_yymmdd.log" are the modified data prepared by modifying or deleting a predetermined target portion (e.g. a portion describing information that should be kept secret such as customer information), and the recording data "confidential information B_yymmdd.log.enc" are the second encrypted data encrypted using the second security key.

Thirdly, the log information preparation section 207 prepares log information including the first encrypted data related to the recording data indicating the content of communication of the type that meets the predetermined first condition together with the modified data prepared from the recording data. In the exemplary embodiment, in the case where the type of the content of communication indicated by the first transmission data transmitted from the information processing device 3 meets the first condition (that is, in the case where the type of the content of communication is set to "first encryption"), the log information preparation section 207 prepares log information including the first encrypted data included in the first transmission data together with the modified data prepared from the recording data included in the first transmission data.

In this case, the log information preparation section 207 prepares log information including the recording data indicated in line 4, in particular, among the log information illustrated in FIG. 10. The recording data "confidential information A(mod)_yymmdd.log" are the modified data, and the recording data "confidential information A_yymmdd.log.enc" are the first encrypted data encrypted using the first security key.

The first encrypted data may be decrypted only by the information processing device 3 that prepared the first encrypted data.

In the exemplary embodiment, in addition, the log information preparation section 207 prepares the following two types of log information, for example, as the log information including the recording data indicating the content to be transmitted to the information processing device 3.

Firstly, the log information preparation section 207 prepares log information including unencrypted recording data. More specifically, in the case where the content of data processing set for the type of the content for transmission designated in the instruction for transmission provided by the second information processing section 209 to be discussed later is "no encryption", the log information preparation section 207 prepares log information including unencrypted recording data acquired by the second recording data acquisition section 204. The log information preparation section 207 prepares log information indicated in line 6 (specifically, log information including unencrypted recording data "billing meter_yymmdd.log" with the sender being "information management device"), in particular, among the log information illustrated in FIG. 10, for example.

Secondly, the log information preparation section 207 prepares log information including the second encrypted data together with the recording data. In the exemplary embodiment, in the case where the content of data processing set for the type of the content of communication designated in the instruction for transmission provided by the second information processing section 209 to be discussed later is "second encryption", the log information preparation section 207 prepares log information including the second encrypted data prepared by encrypting the acquired recording data together with the modified data prepared from the recording data. The log information preparation section 207 prepares log information including the recording data indicated in line 3, in particular, among the log information illustrated in FIG. 10, for example.

In the case where the content of data processing set for the type of the content for transmission is "first encryption", meanwhile, the log information preparation section 207 prepares log information including the second encrypted data with the supplementary information rendered as "temporary storage" instead of preparing log information including the first encrypted data. The log information preparation section 207 prepares log information including the recording data indicated in line 5, in particular, among the log information illustrated in FIG. 10, for example. In this case, the log information preparation section 207 may prepare log information including unencrypted recording data with the supplementary information rendered as "temporary storage".

In this way, the log information preparation section 207 prepares log information including at least one of unencrypted recording data indicating the content of such communication, first encrypted data and second encrypted data which are encrypted recording data, and modified data prepared by modifying or deleting a predetermined portion of the recording data, in accordance with the content of data processing set for the type of the content of communication between the information management device 2 and the information processing device 3.

The log information recording section 299 stores the log information prepared by the log information preparation section 207. The log information recording section 299 stores the log information including plural types of recording data illustrated in FIG. 10, for example.

In addition, the log information recording section 299 stores the recording data or encrypted recording data transmitted by the second transmission data transmitting section 211 to be discussed later at least until encrypted data related to the transmitted recording data are received from the information processing device 3. More specifically, the log information recording section 299 stores the recording data or second encrypted data prepared by encrypting the recording data until data substitution is performed by the log information recording section 208 to be discussed later.

The log information recording section 208 records the log information prepared by the log information preparation section 207 in the log information recording section 299. In addition, in the case where the third transmission data including the third encrypted data are transmitted from the information processing device 3, the log information recording section 208 records the transmitted third encrypted data in substitution for data among the recording data or the second encrypted data stored in the log information recording section 299 related to the transmitted third encrypted data. More specifically, the log information recording section 208 records the transmitted third encrypted data in substitution for the second encrypted data (or unencrypted recording data) with the supplementary information rendered as "temporary storage".

For example, the log information recording section 208 records, in the log information, the first encrypted data prepared by encrypting, via the information processing device 3, the recording data related to the second encrypted data "confidential information A_res_yymmdd.log.enc" with the supplementary information rendered as "temporary storage", among the log information illustrated in FIG. 10, in substitution for the second encrypted data. The first encrypted data recorded in the log information in this way are rendered as formal recording data. Therefore, the log information recording section 208 may erase the supplementary information rendered as "temporary storage" when the first encrypted data are recorded.

The second information processing section 209 executes predetermined information processing, and provides an instruction for transmission to the information processing device 3. The second information processing section 209 executes information processing according to the transmission data transmitted from the information processing device 3, for example, and provides an instruction for transmission that designates the result of execution of the information processing as the content to be transmitted to the information processing device 3. In addition, the second information processing section 209 provides an instruction for transmission that designates a request for the information processing device 3 to execute information processing as the content for transmission, for example.

The second transmission data preparation section 210 prepares the second transmission data indicating the content to be transmitted to the information processing device 3. In addition, the second transmission data preparation section 210 prepares the second transmission data including the recording data acquired by the second recording data acquisition section 204 (or the second encrypted data prepared by encrypting the recording data). For example, in the case where the content of data processing set for the type of the content for transmission is "first encryption process", the second transmission data preparation section 210 prepares the second transmission data including the recording data indicating the content for transmission.

The second transmission data transmitting section 211 transmits the second transmission data prepared by the second transmission data preparation section 210 to the information processing device 3. In addition, the second transmission data transmitting section 211 transmits the recording data indicating the content of communication between the information management device 2 and the information processing device 3 to the information processing device 3. More specifically, in the case where the content of data processing set for the type of the content to be transmitted to the information processing device 3 is "first encryption process", the second transmission data transmitting section 211 transmits the second transmission data including the recording data acquired by the second recording data acquisition section 204 (or the second encrypted data prepared by encrypting the recording data).

In this way, in the case where the second transmission data including the recording data are transmitted to the information processing device 3, the second transmission data reception section 351 of the information processing device 3 receives the transmitted second transmission data, the first encryption section 305 of the information processing device 3 prepares the third encrypted data by encrypting the recording data included in the second transmission data, and the first/third transmission data transmitting section 307 of the information processing device 3 transmits the third transmission data including the third encrypted data. Then, the first/third transmission data reception section 201 of the information management device 2 receives the transmitted third transmission data, and the log information recording section 208 of the information management device 2 records the third encrypted data included in the received third transmission data in substitution for the second encrypted data (or unencrypted recording data) temporarily stored in the log information recording section 299. That is, data (third encrypted data) encrypted using the first security key are prepared also for the recording data which indicate the content transmitted from the information management device 2 and for which the content of data processing is set to "first encryption process", and recorded in the log information.

In addition, in the case where the second transmission data including the second encrypted data are transmitted by the second transmission data transmitting section 211, the decryption section 352 of the information processing device 3 decrypts the second encrypted data included in the second transmission data so that the information processing device 3 transmits the third transmission data including the third encrypted data in the same manner as described above. Then, the log information recording section 208 of the information management device 2 records the third encrypted data included in the third transmission data in substitution for the second encrypted data (or unencrypted recording data) in the same manner as described above.

The second transmission data transmitting section 211 may transmit the first encrypted data and the third encrypted data transmitted from the information processing device 3 to the information processing device 3 in response to a request from the service provider who uses the information management device 2, for example. In this case, the decryption section 352 of the information processing device 3 may decrypt the transmitted first encrypted data and third encrypted data to prepare the recording data before being encrypted. In addition, the first/third transmission data transmitting section 307 of the information processing device 3 may transmit the decrypted recording data to the information management device 2, and the log information recording section 208 of the information management device 2 may record the log information including the decrypted recording data in the log information recording section 299.

The second decryption section 212 decrypts the second encrypted data. More specifically, the second decryption section 212 decrypts the second encrypted data encrypted by the second encryption section 205 using the decryption key (specifically, the second security key) stored in the second security key storage section 298 in response to a request from the service provider who uses the information management device 2. In the exemplary embodiment, the second decryption section 212 may not acquire the first security key stored in the first security key storage section 399 of the information processing device 3. Therefore, the second decryption section 212 may not decrypt the first encrypted data.

[4. Sequence Diagram and Flowchart]

An example of the process executed in the information management system 1 according to the exemplary embodiment will be described below with reference to the sequence diagrams and the flowcharts illustrated in FIGS. 11 to 17.

[4-1. Overall Process]

[4-1(1). Overall Process (S101 to S102)]

Figure 11:
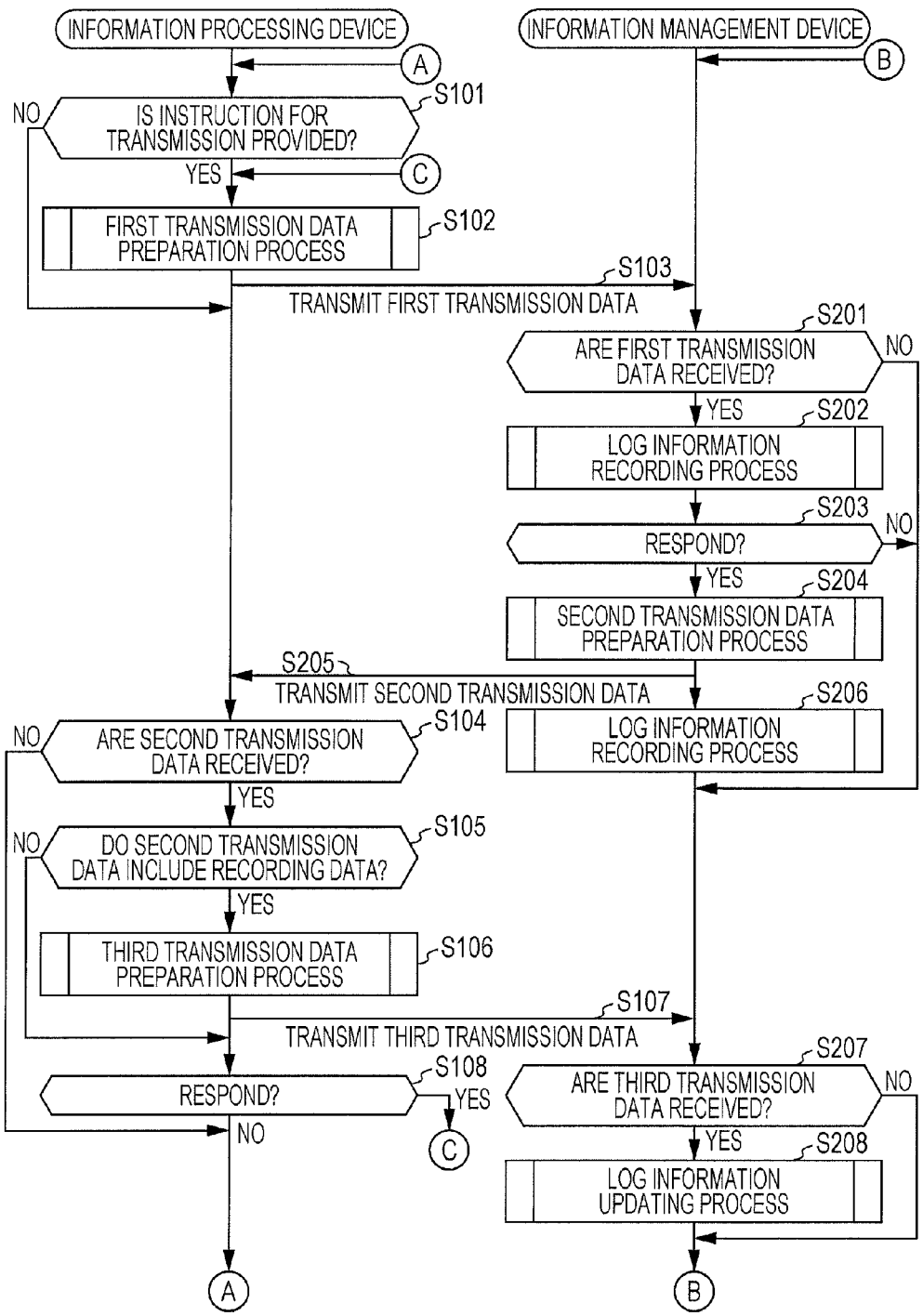
FIG. 11 is a sequence diagram illustrating an example of a process executed in the information management system.

FIG. 11 is a sequence diagram illustrating an example of the process executed in the information management system 1. As illustrated in FIG. 11, in the case where the first information processing section 301 of the information processing device 3 provides an instruction for transmission to the information management device 2 (step S101: Y), the first/third transmission data preparation section 306 of the information processing device 3 executes a first transmission data preparation process (step S102). The first transmission data preparation process executed in step S102 will be described in detail with reference to the flowchart of FIG. 12.

[4-2. First Transmission Data Preparation Process]

Figure 12:
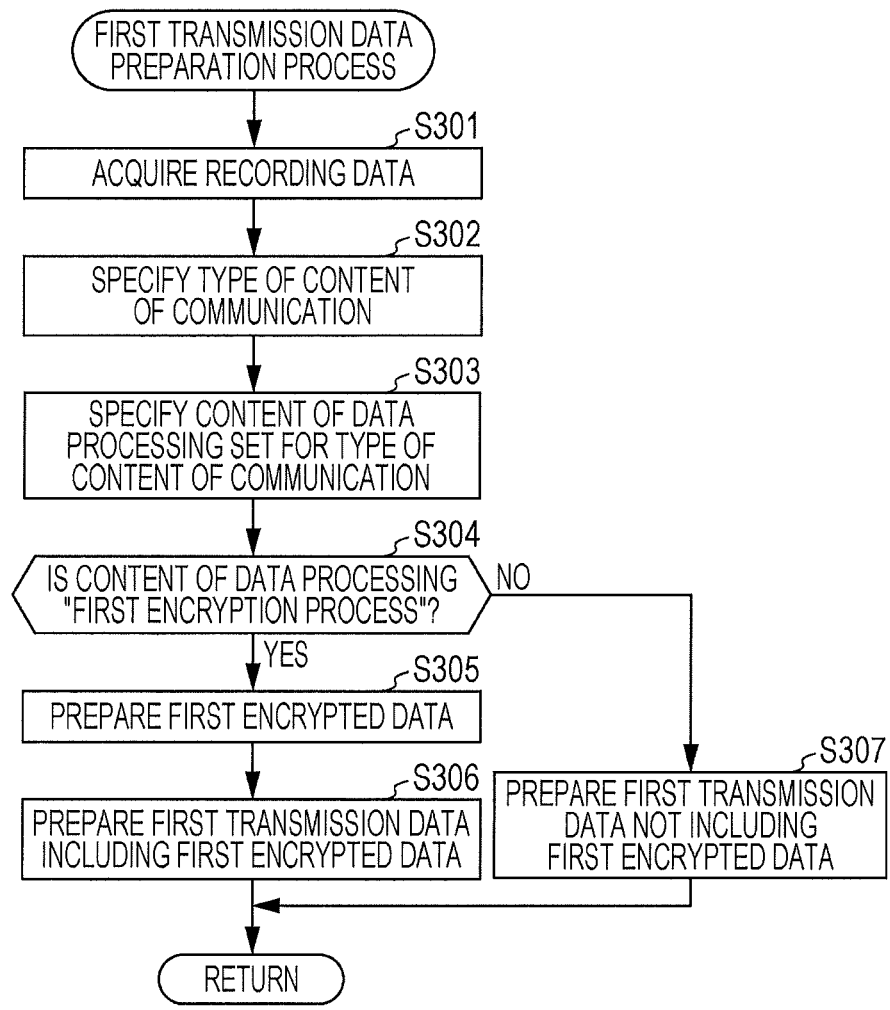
FIG. 12 is a flowchart illustrating an example of a first transmission data preparation process.

FIG. 12 is a flowchart illustrating an example of the first transmission data preparation process. As illustrated in FIG. 12, the first recording data acquisition section 302 of the information processing device 3 acquires recording data indicating the content for transmission such as a billing meter value and customer information, for example (step S301). The first processing content specifying section 304 of the information processing device 3 specifies the type of the content for transmission (step S302).

The first processing content specifying section 304 of the information processing device 3 specifies the content of data processing set for the type of the content of communication specified in step S302 (step S303). For example, in the case where the setting information illustrated in FIG. 5 is stored in the first setting information storage section 398 and the specified content of data processing is "notification of confidential information A", the first processing content specifying section 304 specifies "first encryption process" as the content of data processing set for the type of the content for transmission.

The first/third transmission data preparation section 306 of the information processing device 3 determines whether or not the content of data processing specified in step S303 is "first encryption process" (step S304). In the case where the specified content of data processing is "first encryption process (step S304: Y), the first encryption section 305 of the information processing device 3 prepares first encrypted data by encrypting the recording data (step S305), the first/third transmission data preparation section 306 prepares first transmission data including the first encrypted data (step S306), and the first transmission data preparation process is terminated.

In the case where the content of data processing specified in step S303 is not "first encryption process" (step S303: N), meanwhile, the first/third transmission data preparation section 306 prepares first transmission data not including the first encrypted data (step S307). In the exemplary embodiment, the first/third transmission data preparation section 306 prepares first transmission data including the recording data acquired in step S301. Now, the description returns to the sequence diagram illustrated in FIG. 11.

[4-1(2). Overall Process (S103 and S201 to S202)]

Returning to FIG. 11, the first/third transmission data transmitting section 307 of the information processing device 3 transmits the first transmission data prepared in step S102 to the information management device 2 (step S103). If the first/third transmission data reception section 201 of the information management device 2 receives the first transmission data transmitted from the information processing device 3 (step S201: Y), the log information preparation section 207 and the log information recording section 208 of the information management device 2 executes a log information recording process on the basis of the received first transmission data (step S202). The log information recording process executed in step S202 will be described in detail with reference to the flowchart of FIG. 13.

[4-3(1). Log Information Recording Process (in reference to First Transmission Data)]

Figure 13:
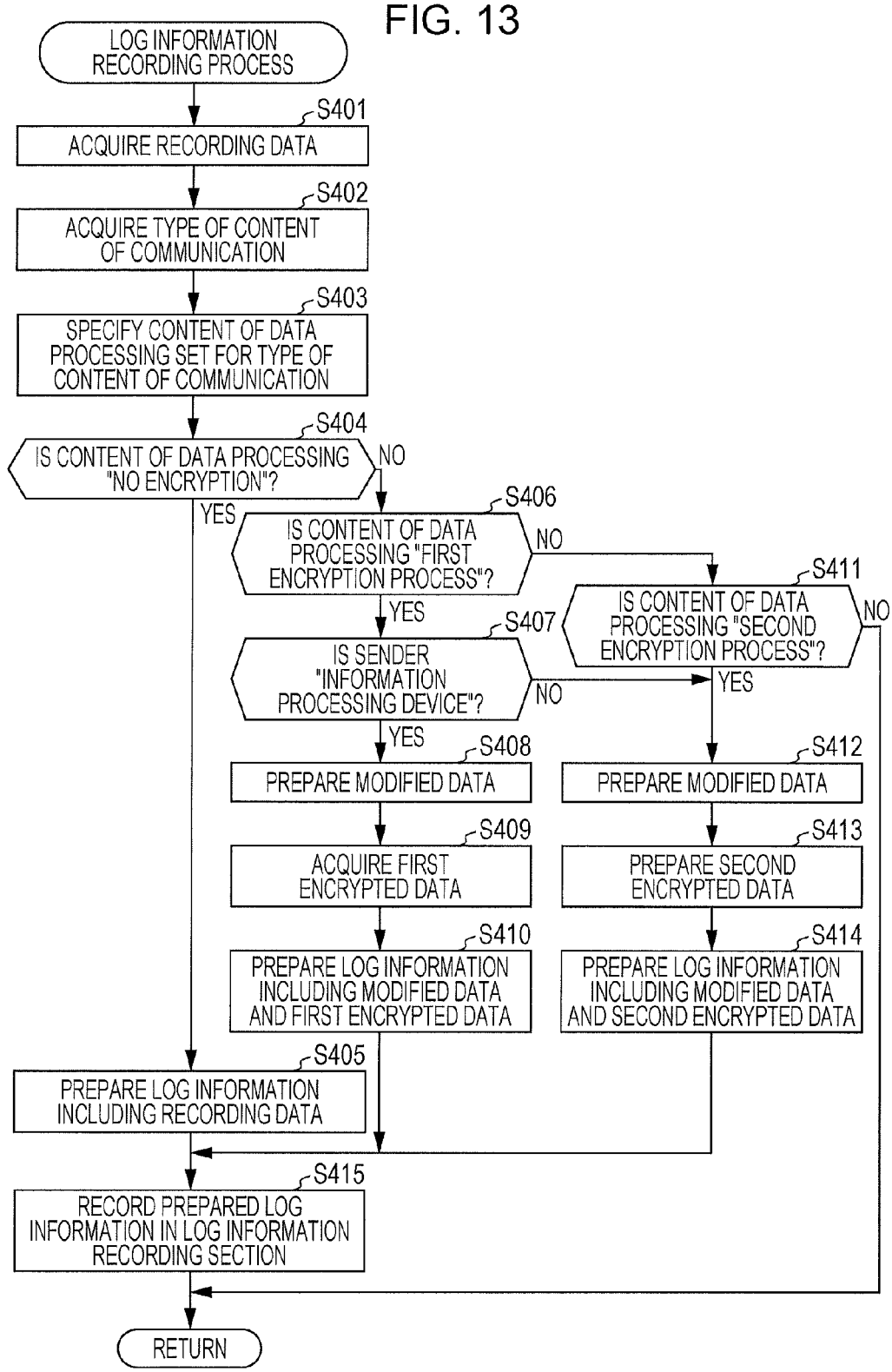
FIG. 13 is a flowchart illustrating an example of a log information recording process.

FIG. 13 is a flowchart illustrating an example of the log information recording process. As illustrated in FIG. 13, the second recording data acquisition section 204 of the information management device 2 acquires recording data indicating the content transmitted from the information processing device 3 (step S401). More specifically, the second recording data acquisition section 204 acquires recording data included in the first transmission data transmitted from the information processing device 3.

The second processing content specifying section 203 of the information management device 2 specifies the type of the content of communication for the content transmitted from the information processing device 3 (step S402), and the second processing content specifying section 203 of the information management device 2 specifies the content of data processing set for the type of the content of communication specified in step S402 (step S403). The log information preparation section 207 determines whether or not the content of data processing specified in step S403 meets a predetermined condition.

In the case where the content of data processing specified in step S403 is "no encryption" (step S404: Y), the log information preparation section 207 prepares log information including the recording data indicating the content of communication itself acquired in step S401 (step S405).

In the case where the content of data processing is "first encryption process" (step S406: Y) and the sender is "information processing device" (that is, log information is prepared on the basis of the first transmission data received from the information processing device 3) (step S407: Y), the modified data preparation section 206 prepares modified data by modifying or erasing a predetermined target portion of the recording data acquired in step S401 (for example, data in which a portion that should be kept secret such as customer information has been modified as illustrated in FIG. 9) (step S408), the log information preparation section 207 acquires first encrypted data included in the first transmission data (step S409), and prepares log information including the first encrypted data together with the modified data (step S410). The service provider may not identify the target portion that should be kept secret directly from the modified data and the encrypted data, and the first encrypted data may be decrypted only by the information processing device 3 that prepared the first encrypted data.

In the case where the content of data processing is "second encryption process" (step S411: Y), the modified data preparation section 206 prepares modified data in the same manner as in step S408 (step S412), the second encryption section 205 prepares second encrypted data by encrypting the acquired recording data using the second security key (step S413), and the log information preparation section 207 prepares log information including the second encrypted data together with the modified data (step S414). The second encrypted data included in the log information may be decrypted at the service provider's discretion via the second decryption section 212 of the information management device 2.

The log information recording section 208 records the prepared log information in the log information recording section 299 (step S415), and the information management device 2 terminates the log information recording process. Now, the description returns to the sequence diagram illustrated in FIG. 11.

[4-1(3). Overall Process (S203 to S204)]

Returning to FIG. 11, the second information processing section 209 of the information management device 2 decides whether or not to respond to the first transmission data indicating the content transmitted from the information processing device 3 (step S203). In the case where the second information processing section 209 decides to respond (step S203: Y), the second transmission data preparation section 210 of the information management device 2 executes a second transmission data preparation process (step S204). The second transmission data preparation process executed in step S204 will be described in detail with reference to the flowchart of FIG. 14.

[4-4. Second Transmission Data Preparation Process]

Figure 14:
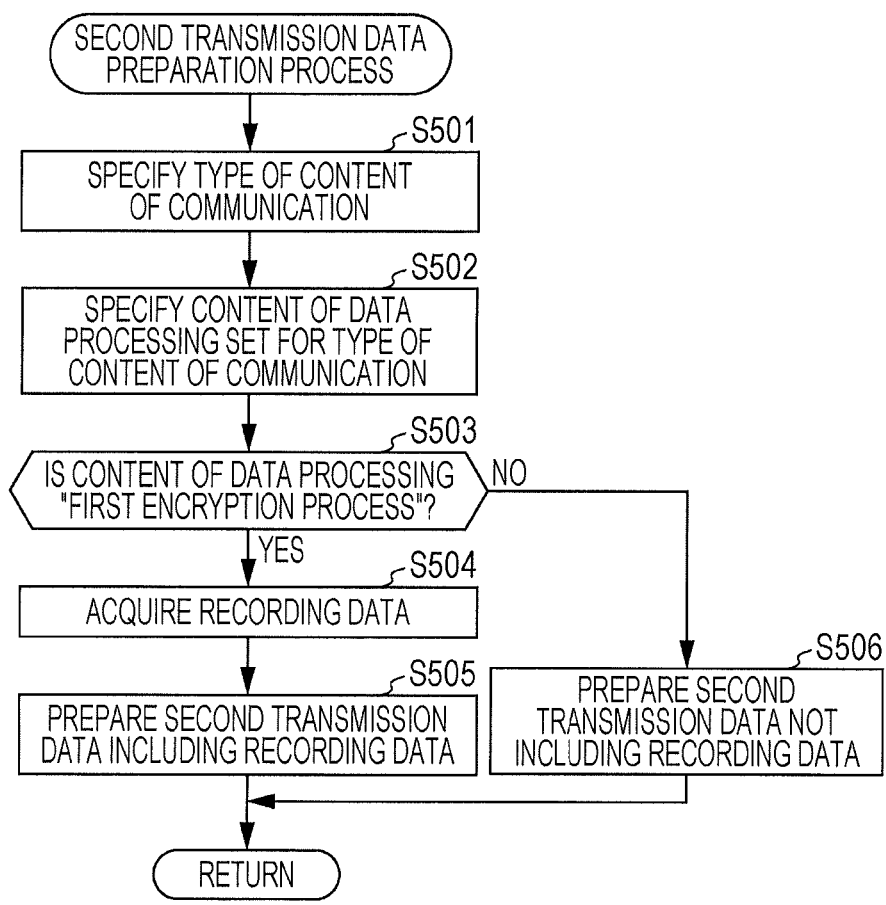
FIG. 14 is a flowchart illustrating an example of a second transmission data preparation process.

FIG. 14 is a flowchart illustrating an example of the second transmission data preparation process. As illustrated in FIG. 14, the second processing content specifying section 203 of the information management device 2 specifies the type of the content for transmission for a response to the information processing device 3 (step S501). In addition, the second processing content specifying section 203 specifies the content of data processing set for the type of the content of communication specified in step S501 (step S502).

The second transmission data preparation section 210 of the information processing device 3 determines whether or not the specified content of data processing is "first encryption process" (step S503). In the case where the specified content of data processing is "first encryption process (step S503: Y), the second recording data acquisition section 204 of the information management device 2 acquires recording data indicating the content to be transmitted to the information processing device 3 (step S504), and the second transmission data preparation section 210 prepares second transmission data including the recording data (step S505). The second transmission data prepared in step S505 may include second encrypted data related to the recording data instead of including the recording data.

In the case where the specified content of data processing is not "first encryption process" (step S503: N), meanwhile, the second transmission data preparation section 210 prepares second transmission data not including the recording data (step S506), and the second transmission data preparation process is terminated. Now, the description returns to the sequence diagram illustrated in FIG. 11.

[4-1(4). Overall Process (S205 to S206)]

Returning to FIG. 11, the second transmission data transmitting section 211 of the information management device 2 transmits the second transmission data prepared in step S204 to the information processing device 3 (step S205). The information management device 2 executes a log information recording process on the basis of the second transmission data transmitted to the information processing device 3 (step S206). The log information recording process executed in step S204 will be described in detail with reference to the flowchart of FIG. 13.

[4-3(2). Log Information Recording Process (in Reference to Second Transmission Data)]

As illustrated in the flowchart of FIG. 13, the second recording data acquisition section 204 of the information management device 2 acquires recording data indicating the content to be transmitted to the information processing device 3 designated in an instruction for transmission provided by the second information processing section 209 of the information management device 2 (step S401). The second processing content specifying section 203 of the information management device 2 specifies the type of the content of communication (step S402), and specifies the content of data processing set for the specified type of the content of communication (step S403).

The log information preparation section 207 determines whether or not the content of data processing specified in step S402 meets a predetermined condition. Specifically, in the case where the content of data processing is "no encryption" (step S404: Y), the log information preparation section 207 prepares log information including the recording data (step S405).

In the case where the content of data processing is "second encryption process" (step S411: Y), the log information preparation section 207 prepares log information including the second encrypted data together with the modified data (steps S412 to S414).

In the case where the content of data processing is "first encryption process" (step S406: Y) and the sender is "information management device" (that is, in the case where log information related to the content to be transmitted to the information processing device 3 is prepared) (step S407: N), the log information preparation section 207 prepares log information including the second encrypted data together with the modified data in the same manner as described above. In this case, the log information preparation section 207 prepares log information including the second encrypted data with the supplementary information rendered as "temporary storage". In this case, the log information preparation section 207 may prepare log information including unencrypted recording data with the supplementary information rendered as "temporary storage".

The log information recording section 208 records the prepared log information in the log information recording section 299 (step S415), and the information management device 2 terminates the log information recording process. Now, the description returns to the sequence diagram illustrated in FIG. 11.

[4-1(5). Overall Process (S104 to S106)]

Returning to FIG. 11, in the case where the second transmission data reception section 351 of the information processing device 3 receives the second transmission data transmitted from the information management device 2 (step S104: Y) and the received second transmission data include recording data (step S105: Y), the first/third transmission data preparation section 306 of the information processing device 3 executes a third transmission data preparation process (step S106). The third transmission data preparation process executed in step S106 will be described in detail with reference to the flowchart of FIG. 15.

[4-5. Third Transmission Data Preparation Process]

Figure 15:
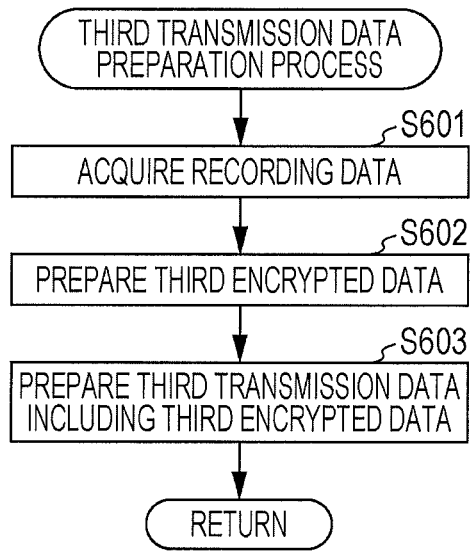
FIG. 15 is a flowchart illustrating an example of a third transmission data preparation process.

FIG. 15 is a flowchart illustrating an example of the third transmission data preparation process. As illustrated in FIG. 15, the first recording data acquisition section 302 of the information processing device 3 acquires recording data included in the second transmission data transmitted from the information management device 2 (step S601). In the case where the second transmission data include the second encrypted data, the first recording data acquisition section 302 may acquire the recording data before being encrypted with the decryption section 352 of the information processing device 3 decrypting the second encrypted data.

The first encryption section 305 of the information processing device 3 prepares third encrypted data by encrypting the encrypted data acquired in step S601 using the first security key (step S602). The first/third transmission data preparation section 306 prepares third transmission data including the third encrypted data (step S603), and the third transmission data preparation process is terminated. Now, the description returns to the sequence diagram illustrated in FIG. 11.

[4-1(6). Overall Process (S107 and S207 to S208)]

Returning to FIG. 11, the first/third transmission data transmitting section 307 of the information processing device 3 transmits the third transmission data prepared in step S106 to the information management device 2 (step S107). If the first/third transmission data reception section 201 of the information management device 2 receives the third transmission data transmitted from the information processing device 3 (step S207: Y), the log information recording section 208 of the information management device 2 executes a log information updating process on the basis of the received third transmission data (step S208). The log information updating process executed in step S208 will be described in detail with reference to the flowchart of FIG. 16.

[4-6. Log Information Updating Process]

Figure 16:
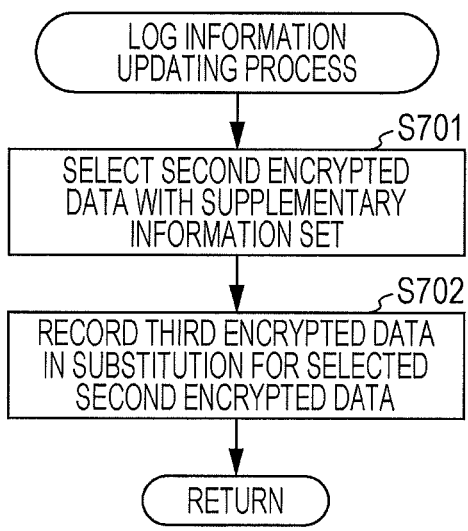
FIG. 16 is a flowchart illustrating an example of a log information updating process.

FIG. 16 is a flowchart illustrating an example of the log information updating process. As illustrated in FIG. 16, the log information recording section 208 of the information management device 2 selects second encrypted data (or unencrypted recording data) with the supplementary information rendered as "temporary storage" among those stored in the log information recording section 299 (step S701). The log information recording section 208 records the third encrypted data included in the third transmission data transmitted from the information processing device 3 in substitution for the data selected in step S701 (step S702). That is, the log information recording section 208 updates the log information by substituting the third encrypted data, which are prepared by encrypting using the first security key the recording data which indicate the content transmitted from the information management device 2 and for which the content of data processing is set to "first encryption process", for the temporarily stored recording data. Now, the description returns to the sequence diagram illustrated in FIG. 11.

[4-1(7). Overall Process (S108)]

Returning to FIG. 11, the first information processing section 301 of the information processing device 3 decides whether or not to respond to the second transmission data from the information management device 2 received in step S104 (step S108). In the case where the first information processing section 301 decides to respond (step S108: Y), the first/third transmission data preparation section 306 of the information processing device 3 prepares first transmission data again (step S102), the first/third transmission data transmitting section 307 of the information processing device 3 transmits the prepared first transmission data (step S103), and the information management device 2 executes a log information recording process again on the basis of the received first transmission data (steps S201 and S202).

In the foregoing description, log information indicating the content of communication started by the information processing device 3, among communication performed between the information management device 2 and the information processing device 3, is prepared. However, log information indicating the content of communication started by the information management device 2 may also be prepared. Such a process will be described below with reference to the flowchart of FIG. 17.

[4-1(8). Overall Process (S1201 to S1208 and S1101 to S1107)]

Figure 17:
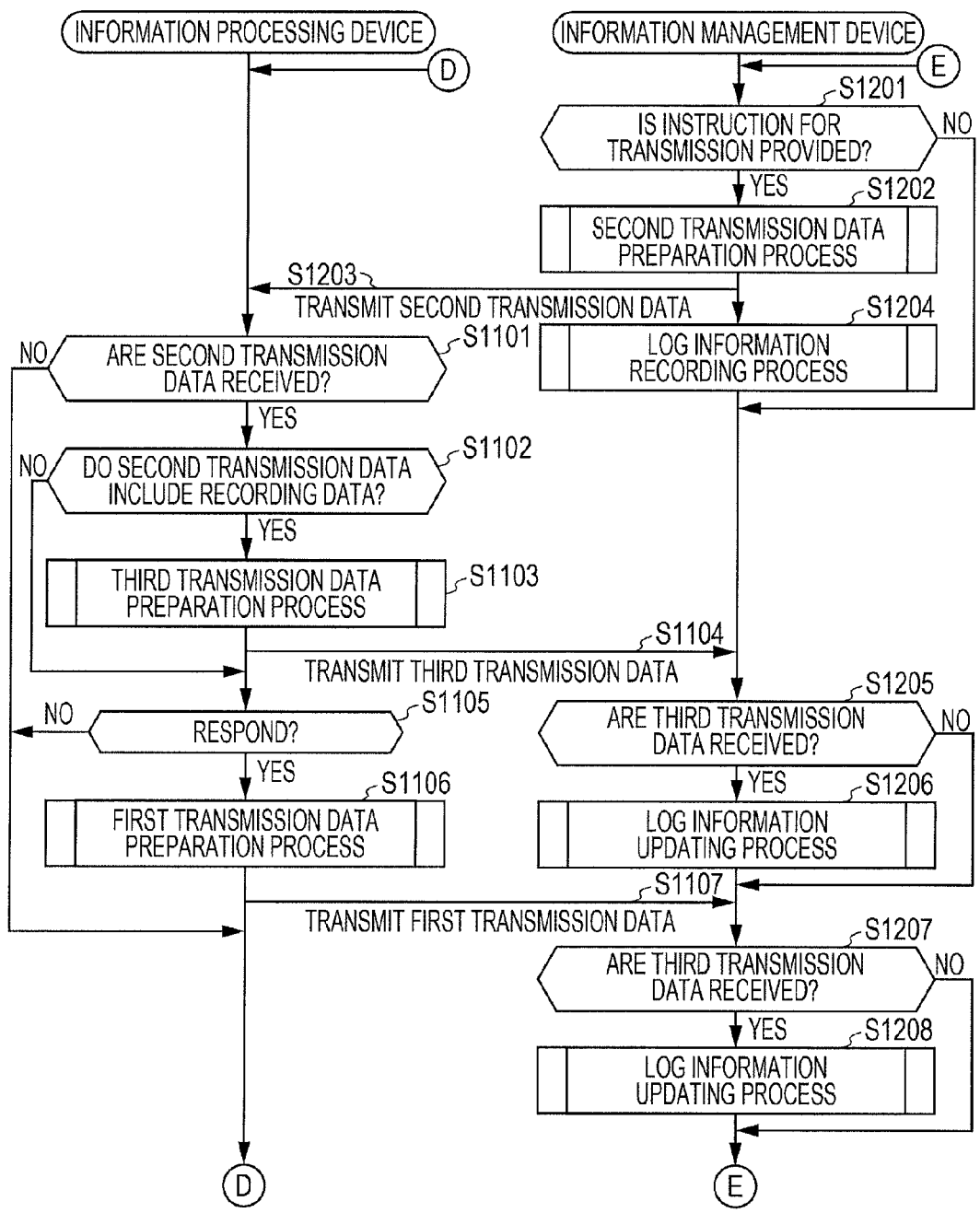
FIG. 17 is a sequence diagram illustrating an example of a process executed in the information management system.

FIG. 17 is a sequence diagram illustrating an example of the process executed in the information management system 1. As illustrated in FIG. 17, in the case where the second information processing section 209 of the information management device 2 provides an instruction for transmission to the information processing device 3 (step S1201: Y), the second transmission data preparation section 210 of the information management device 2 executes a second transmission data preparation process (step S1202), and the second transmission data transmitting section 211 of the information management device 2 transmits the prepared second transmission data (step S1203). In the case where the content of data processing set for the content for transmission is set to "first encryption process", the second transmission data transmitting section 211 transmits the second transmission data including the recording data indicating the content for transmission.

The log information preparation section 207 and the log information recording section 208 of the information management device 2 execute a log information recording process (step S1204). Specifically, the log information preparation section 207 of the information management device 2 prepares log information including at least one of recording data indicating the content for transmission itself and first encrypted data, second encrypted data, and modified data related to the recording data, in accordance with the content of data processing set for the content to be transmitted to the information processing device 3. The log information recording section 208 of the information management device 2 records the prepared log information in the log information recording section 299 of the information management device 2. In the case where the content of data processing is set to "first encryption process", the log information preparation section 207 prepares log information including second encrypted data (or unencrypted recording data) with the supplementary information rendered as "temporary storage".

In the case where the second transmission data reception section 351 of the information processing device 3 receives the second transmission data (step S1101: Y) and the received second transmission data include recording data (step S1102: Y), the first/third transmission data preparation section 306 executes a third transmission data preparation process (step S1103), and the first/third transmission data transmitting section 307 transmits third transmission data including third encrypted data prepared by encrypting the recording data transmitted from the information management device 2 (step S1104).

If the first/third transmission data reception section 201 of the information management device 2 receives the third transmission data transmitted from the information processing device 3 (step S1205: Y), the log information recording section 208 of the information processing device 3 executes a log information updating process (step S1206). That is, the log information recording section 208 records, in the log information recording section 299, the third encrypted data included in the received third transmission data in substitution for the second encrypted data (or unencrypted recording data) with the supplementary information rendered as "temporary storage".

In the case where the first information processing section 301 of the information processing device 3 decides to respond to the transmission data from the information management device 2 (step S1105: Y), the first/third transmission data preparation section 306 executes a first transmission data preparation process (step S1106), and the first/third transmission data transmitting section 307 transmits the first transmission data including the recording data or the first encrypted data (step S1107).

If the first/third transmission data reception section 201 of the information management device 2 receives the first transmission data transmitted from the information processing device 3 (step S1207: Y), the information management device 2 executes a log information recording process (step S1208). That is, the log information preparation section 207 of the information management device 2 prepares log information including at least one of recording data indicating the content for transmission itself and first encrypted data, second encrypted data, and modified data related to the recording data, in accordance with the content of data processing set for the content transmitted from the information processing device 3. The log information recording section 208 of the information management device 2 records the prepared log information in the log information recording section 299 of the information management device 2. In this way, the log information preparation section 207 of the information management device 2 also prepares log information indicating the content of communication started by the information management device 2.

In the information management system 1 described above, the information management device 2 prepares log information indicating the content of communication performed with the information processing device 3. More specifically, the information management device 2 prepares log information including at least one of recording data indicating the content of communication itself, first encrypted data encrypted using the first security key managed in the information processing device 3, second encrypted data encrypted using the second security key which is different from the first security key and managed in the information management device 2, and modified data prepared by modifying or erasing a predetermined target portion of the recording data, in accordance with the content of data processing set for the type of the content of communication.

In addition, the information management system 1 stores the recording data or the second encrypted data transmitted from the information management device 2 to the information processing device 3 temporarily until the information management device 2 receives substitute data (specifically, third encrypted data prepared by encrypting the recording data using the first security key). That is, in the case where the third encrypted data are received, the information management device 2 stores the received third encrypted data in substitution for recording data or second encrypted data with the supplementary information rendered as temporary storage in the log information.

Although an exemplary embodiment of the present invention has been described above, the present invention is not limited thereto. For example, the information processing device 3 does not necessarily include the first setting information storage section 398. In this case, information set in the first setting section 303 of the information processing device 3 may be stored in the second setting information storage section 297 of the information management device 2, and the first processing content specifying section 304 of the information processing device 3 may specify the content of data processing associated with the device ID which identifies the information processing device 3 among those stored in the second setting information storage section 297.

What is claimed is:

1. An information management system comprising:
an information processing device; and
an information management device that prepares log information indicating a content of communication with the information processing device,
wherein the information processing device includes
a recording data acquisition unit that acquires recording data indicating a content of communication between the information management device and the information processing device,
an encryption unit that encrypts the recording data to prepare encrypted data, and
a transmitting unit that transmits the encrypted data to the information management device, and
the information management device includes a log information preparation unit that prepares the log information including the encrypted data and including modified data prepared by modifying or deleting a predetermined portion of the recording data, the log information preparation unit preparing log information including unencrypted recording data indicating the content of the communication, first encrypted data and second encrypted data which are both encrypted recording data.

2. The information management system according to claim 1,
wherein the information management device further includes a second encryption unit that encrypts recording data indicating a content of communication between the information management device and the information processing device to prepare the second encrypted data, and
the log information preparation unit prepares the log information including the second encrypted data related to the recording data indicating a content of communication of a type that meets a predetermined second condition.

3. The information management system according to claim 2,
wherein the type of the content of communication that meets the first condition and the type of the content of communication that meets the second condition are different from each other,
the encryption unit prepares the encrypted data using a first encryption key, and
the second encryption unit prepares the second encrypted data using a second encryption key that is different from the first encryption key.

4. The information management system according to claim 1,
wherein the log information preparation unit prepares the log information including modified data prepared by modifying or erasing a predetermined target portion of the recording data.

5. The information management system according to claim 4,
wherein the log information preparation unit prepares the log information including an encrypted version of the target portion together with the modified data.

6. The information management system according to claim 1,
wherein the information management device further includes a second transmitting unit that transmits recording data indicating a content of communication between the information management device and the information processing device to the information processing device, and
the recording data acquisition unit receives at least one piece of the recording data from the information management device.

7. The information management system according to claim 6,
wherein the information management device further includes a storage unit that stores the recording data transmitted from the second transmitting unit or encrypted data prepared from the recording data at least until the encrypted data related to the transmitted recording data are received from the information processing device.

8. The information management system according to claim 1, wherein the prepared log information include a data and time when the recording data are updated and a device ID which identifies the information processing device involved in the communication.

* * * * *